Dec. 4, 1962 A. W. NELSON 3,066,946
TOWING DEVICE

Filed Feb. 10, 1959 2 Sheets-Sheet 1

INVENTOR.
ARTHUR W. NELSON
BY Abraham Friedman
ATTORNEY

Dec. 4, 1962 A. W. NELSON 3,066,946
TOWING DEVICE
Filed Feb. 10, 1959 2 Sheets-Sheet 2
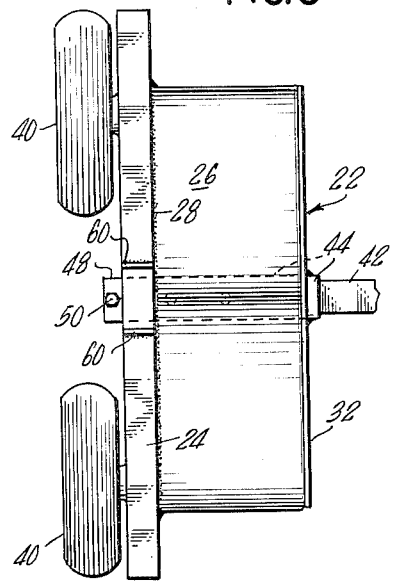
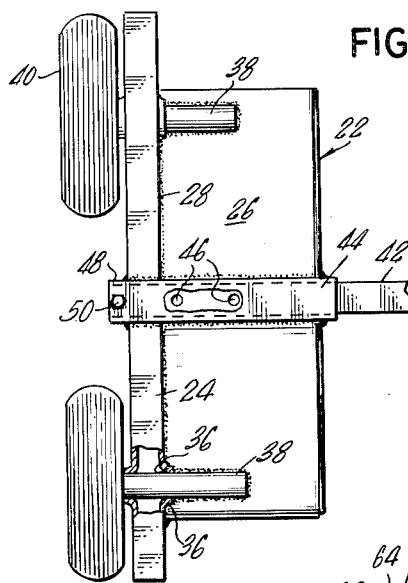
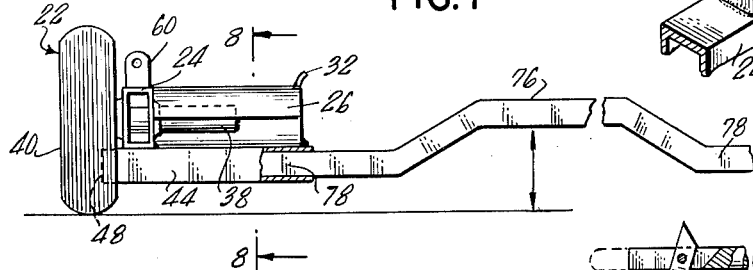
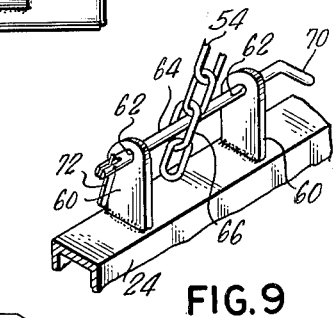
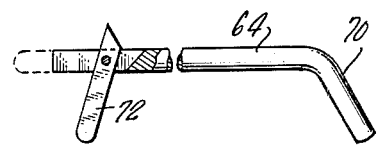
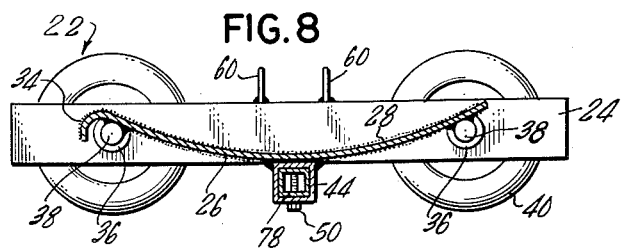
INVENTOR.
ARTHUR W. NELSON
BY Abraham Friedman
ATTORNEY United States Patent Office 3,066,946
Patented Dec. 4, 1962

3,066,946
TOWING DEVICE
Arthur W. Nelson, 5903 Preston Court,
Brooklyn, N.Y.
Filed Feb. 10, 1959, Ser. No. 792,319
1 Claim. (Cl. 280—79.1)

This invention relates to a car dolly for use in the towing and transportation of vehicles, particularly wrecked or disabled automobiles.

In the conventional movement or transportation of wrecked or disabled vehicles from place to place, it has been the practice to raise one end of the vehicle by means of a truck-mounted crane and to tow the vehicle along on the wheels which remain in engagement with the ground. This practice has many disadvantages particularly in connection with current models cars which are equipped with automatic transmission systems. Under many circumstances, towing such vehicles along on their rear wheels may result in damage to the automatic transmission system. There are other circumstances wherein damage to the wheels or their mounting means makes it impossible or impractical to utilize the wheels of the vehicle during the towing operation. It has therefore become to be recognized that a car dolly comprises a useful accessory for the usual towing truck in order to enable such emergency vehicle to accomplish its mission under the varying circumstances encountered in the field and particularly those above described.

It is therefore an object of this invention to provide a car dolly which is adapted to efficiently and conveniently support the front or rear wheels of an automobile while being towed or moved from place to place.

It is a further object of this invention to provide a car dolly of the character indicated which may be readily assembled and disassembled by the towing vehicle personnel and which may be readily and conveniently stored and transported in the limited space available in the usual type of towing vehicle.

It is also an object of this invention to provide a car dolly of the character indicated wherein means are provided for adjusting the dimensions of the dolly in accordance with the requirements of the particular vehicle being towed.

It is another object of this invention to provide a car dolly of the character indicated which is provided with means for securely mounting and retaining the towed vehicle in position upon the car dolly.

An additional object of this invention is to provide a car dolly of the character indicated which may be readily assembled and disassembled and which in assembled form provides the requisite structural characteristics for safely and efficiently carrying a towed vehicle from place to place.

It is a still further object of this invention to provide a car dolly of the character indicated so arranged as to provide maximum efficiency and roadability during the towing operation and to provide adequate road clearance therefor.

Other and further objects, benefits and advantages of this invention will become apparent from the description thereof contained in the annexed specification or will otherwise become obvious. It will be understood that the invention here disclosed may be employed for other purposes to which the structure and arrangement are adapted.

In the accompanying drawings:

FIGURE 5 is a fragmentary plan view of the car dolly showing one of the wheel cradle assemblies forming the car dolly;

FIGURE 6 is a bottom view similar to FIGURE 6;

FIGURE 7 is a rear elevational view of a car dolly assembly partly broken away showing a connecting cross-brace having a central portion of modified form;

FIGURE 8 is a cross-section of FIGURE 7 taken along line 8—8 thereof;

FIGURE 9 is a perspective view of a fragment of the side frame of the cradle assembly showing the manner in which the toggle bolt and chain are secured to said side frame; and FIGURE 10 is a side elevational view partly broken away showing the toggle bolt.

Figure 1:
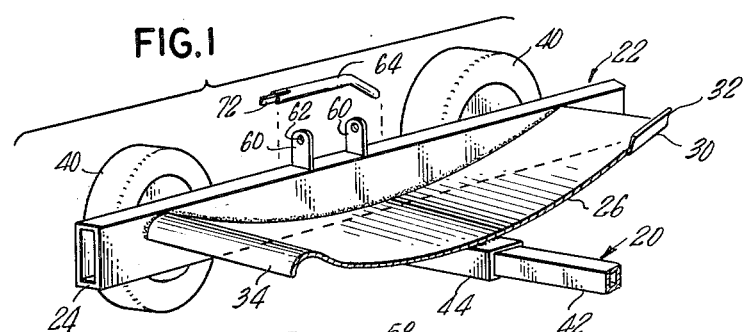
FIGURE 1 is a fragmentary perspective view showing one of the pair of wheel cradle assemblies comprising the car dolly of the present invention.
Figure 2:
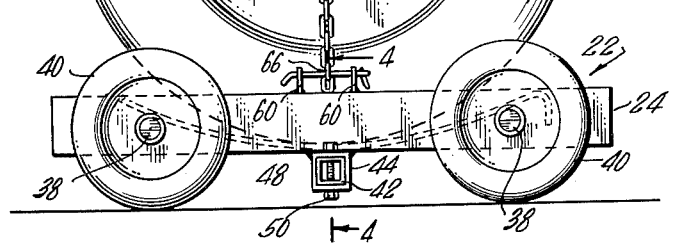
FIGURE 2 is a side elevational view of the car dolly showing a towed vehicle wheel in position thereon.
Figure 3:
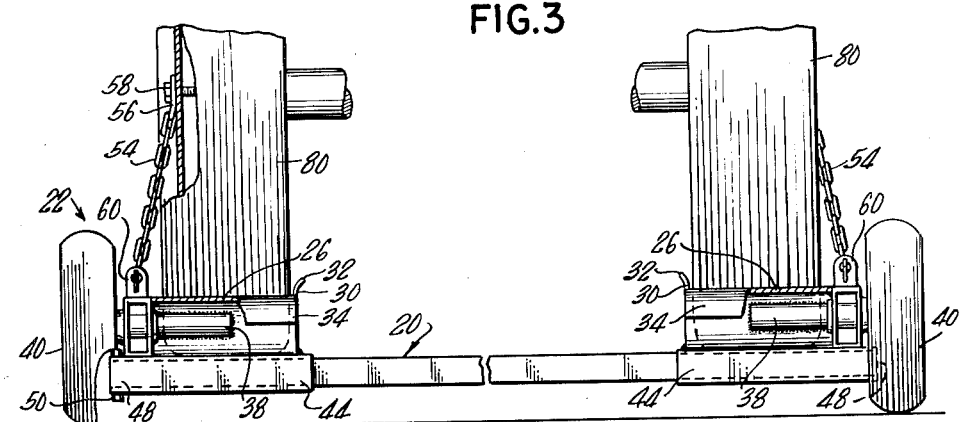
FIGURE 3 is a rear elevational view of the car dolly comprising the present invention partly broken away for purposes of clarity of illustration showing the wheels of a towed vehicle in position thereon.
Figure 4:
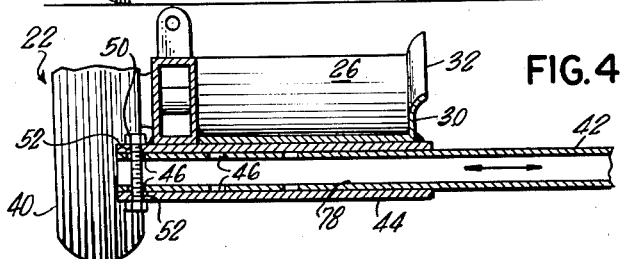
FIGURE 4 is a partial cross-section of FIGURE 2 taken along line 4—4 thereof.

As shown in FIGURES 1, 2 and 3, the car dolly comprising the present invention designated generally by the numeral 20, is comprised of a pair of wheel cradle assemblies interconnected in laterally spaced relation by means of a cross-brace. The wheel cradle assemblies are of similar structure and designated generally by the numeral 22. Since the wheel cradle assemblies 22 are of similar construction, only one of them will be described in detail. Each of the wheel cradle assemblies 22 is comprised of a side frame member 24 which is advantageously formed of tubular steel having a rectangular cross-section. Secured to the inboard surface of the side frame member 24, is a wheel well plate 26. Wheel well 26 is advantageously comprised of a concavely arcuate sheet of metal such as steel and is secured to the inboard surface of the side frame member 24 as by means of welding, as shown at 28 in FIGURE 4. The inboard longitudinally extending side edge of well plate 26 is provided with an upright plate extension or flange 30 which is formed with an arcuate lip 32 and serves as a guide and retaining means for the wheel of the towed vehicle disposed therein while it is being towed. One of the end edges of the wheel well plate 26 is formed into a reversely bent arc as shown at 34 in order to facilitate the insertion of the wheel into the well and to prevent tire damage. The side walls of frame member 24 are apertured as shown at 36 in FIGURES 6 and 8 and stub axles 38 pass through said apertures and are secured as by welding to the flanged rims of said apertures. The inboard ends of the stub axles 38 are secured to the undersurface of the well plate 26 as by welding. A stub axle is thus disposed adjacent each end of the well plate. The outboard end of each stub axle 28 rotatably supports a ground engaging wheel 40.

Ground engaging wheels 40 are arranged in tandem and may be of substantially smaller diameter than the diameter of the usual automobile wheel. Said wheels are provided with suitable rubber tires. The hub of each of wheels 40 is rotatably mounted on the outboard end of its associated stub axle. In order to accomplish the interconnection of the wheel cradle assemblies 22, a tubular socket 44 is secured as by welding to the undersurface of the well plate 26 and side frame member 24 of each of said assemblies. The socket member 44 which is preferably of square tubular cross section and is secured across the low point in the arcuate curvature of the well plate. The cradle assemblies 22 are disposed in laterally spaced confronting relation and are interconnected by means of a cross-brace 42 which advantageously comprises a tubular steel member of square cross section so dimensioned as to be telescopically received within the socket member 44. Each end of the laterally extending cross brace 42 is provided with a series of aligned apertures 46 so that when the ends of transversely extending brace 42 are disposed within the socket members 44, one pair of apertures 46 is brought into alignment with the apertures 52 of outboard extension 48 of the socket member so that a bolt 50 may be passed through the wall of said socket member and main axle to thereby secure the main axle in position within the socket. By providing a plurality of pairs of apertures 46 it is possible to adjust the lateral spacing of the cradle assemblies 22 in order to accommodate vehicles of various widths. The projection of the end of the socket 44 beyond the side frame member 24 permits this to be accomplished in a convenient manner.

The arrangement also permits the entire car dolly to be readily assembled or disassembled since all that is necessary in order to accomplish the assembly operation is to dispose the ends of the cross brace within the socket members and to secure the brace in position by the insertion of the bolts 50 through the registered apertures in the socket and brace.

Means are also provided on each cradle assembly for securing the vehicle in position thereon and to prevent the accidental separation of the towed vehicle from the car dolly during the course of the towing operation. The securing means comprises a chain 54 or similar flexible member, one end of which is provided with an apertured terminal plate 56. When the wheels of the vehicle have been disposed on the dolly, one of the wheel mounting lugs 58 is removed from the hub and replaced after the insertion of the lug through the aperture in terminal plate 56. The other end of the chain 54 is secured to the side frame of the cradle assembly in the manner hereinafter indicated. The upper surface of the side frame is provided with a pair of projecting bosses 60 which are disposed in spaced-apart relation and provided with horizontally aligned apertures 62. The chain 54 is disposed between the bosses 60 and a toggle pin 64 is inserted through the aligned apertures and the link 66 of the chain disposed therebetween, as may be clearly seen from FIGURES 2, 3 and 9. The toggle pin 64, as may be seen from FIGURE 10, comprises a steel rod, one end 70 of which has been angularly bent while the other end thereof is provided with a pivoted lever 72. The pivoted arrangement of the lever 72 permits it to be disposed in alignment with the axis of the pin so as to permit its insertion through apertures 62 and link 66 of the chain 54. After the insertion of pin 64 has been completed, the lever 72 drops to a substantially vertical position thereby preventing the withdrawal of the pin from the apertures. There is thus provided a simple and effective means for securing the vehicle in position on the dolly regardless of variations in the wheel diameter of the towed vehicle. FIGURE 7 illustrates a modified form of cross-brace wherein the central portion 76 of the cross brace member is vertically offset from the terminal portions 78 thereof so as to provide for increased road clearance between the cross-brace and the ground and thereby avoid any accidental contact with projections or objects which may be strewn along the road.

From the foregoing, it will be apparent that there has been here provided a car dolly which may be readily assembled and disassembled and is comprised of three simple assembly units which are light in weight and which may be readily stored within the body of the towing vehicle.

In order to assemble the car dolly, it is merely necessary to dispose the wheel cradle assemblies in laterally spaced relation and to insert the terminal portions of the cross-brace member into sockets 44. The cross-brace is secured in position by simply passing bolts 50 through the aligned apertures in the socket and ends of the cross-brace. The spacing between the wheel cradle assemblies may be readily adjusted by the selection of the appropriate apertures in the ends of the cross brace for registration with the apertures in the socket members. With the car dolly thus assembled, the wheels 80 of the towed vehicle are lowered into position on the wheel well plates and a lug 58 is removed from each wheel to permit the interposition of the apertured terminal plate 56 of the securing chains 54. After the chains 54 have been thus secured to the wheel, the free end of the chain is disposed between the vertically disposed apertured bosses 60 and the toggle pin 64 is inserted through the appropriate chain link in order to secure the chain in position. By this means, the length of the chain is readily adjusted and separation or excessive play between the wheel of the towed vehicle and the car dolly is prevented. The configuration of the cross-brace and sockets provides for an effective interconnection between the wheel well assemblies in order to form the assembled dolly structure.

While I have here shown and described preferred embodiments of my invention, it will be apparent however that this invention is not limited to these embodiments and that many changes, additions and modifications can be made in connection therewith without departing from the spirit and scope of the invention as herein disclosed and hereinafter claimed. Having described my invention what I claim as new and desired to secure by Letters Patent is:

In an apparatus for the ground transport of motor vehicles, a wheel cradle assembly for receiving the wheel of a vehicle to be transported, said assembly comprising a side frame member, a wheel well plate secured to said side frame member along one of the longitudinal side edges thereof, a pair of stub axles respectively secured to said side frame member adjacent the opposite ends of the latter, each of said stub axles having a ground engaging wheel rotatably mounted thereon, a transversely extending socket member secured both to the undersurface of said wheel well plate and to the undersurface of said side frame member centrally of the longitudinal extent of both said wheel well plate and said side frame member, said assembly being adapted to be inter-connected with a similar assembly disposed in laterally spaced relation thereto by means of an interconnecting brace engaged in the respective socket members in order to form said transport device.

References Cited in the file of this patent

UNITED STATES PATENTS

| | | |
|---|---|---|
| 1,224,574 | Sessions | May 1, 1917 |
| 1,558,308 | Sternbergh | Oct. 20, 1925 |
| 1,617,400 | Lanning | Feb. 15, 1927 |
| 1,770,798 | Nicholson | July 15, 1930 |
| 1,871,180 | Kegresse | Aug. 9, 1932 |
| 2,463,744 | Clemens | Mar. 8, 1949 |
| 2,639,926 | Parks | May 26, 1953 |
| 2,943,863 | Corey et al. | July 5, 1960 |

FOREIGN PATENTS

| | | |
|---|---|---|
| 677,437 | Great Britain | Aug. 13, 1952 |